United States Patent
Nozoe

(10) Patent No.: US 8,475,701 B2
(45) Date of Patent: Jul. 2, 2013

(54) SILICONE RUBBER FORMED PRODUCT AND METHOD FOR PRODUCTION THEREOF

(75) Inventor: Tsugio Nozoe, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 1120 days.

(21) Appl. No.: 11/575,036

(22) PCT Filed: Sep. 2, 2005

(86) PCT No.: PCT/JP2005/016577
§ 371 (c)(1), (2), (4) Date: Mar. 9, 2007

(87) PCT Pub. No.: WO2006/028198
PCT Pub. Date: Mar. 16, 2006

(65) Prior Publication Data
US 2007/0256595 A1    Nov. 8, 2007

(30) Foreign Application Priority Data
Sep. 10, 2004 (JP) ................. 2004-263439

(51) Int. Cl.
*B32B 25/20* (2006.01)
*B32B 27/08* (2006.01)
*B32B 27/06* (2006.01)

(52) U.S. Cl.
USPC ........... 264/345; 442/63; 442/99; 442/104; 428/36.1

(58) Field of Classification Search
USPC ........... 264/345; 442/63, 99, 104; 428/36.1
See application file for complete search history.

(56) References Cited

U.S. PATENT DOCUMENTS

| 4,481,341 | A | | 11/1984 | Schlak et al. |
| 5,017,654 | A | | 5/1991 | Togashi et al. |
| 5,407,991 | A | * | 4/1995 | Hikasa et al. ............ 524/491 |
| 5,861,449 | A | | 1/1999 | Akitomo et al. |
| 6,299,952 | B1 | * | 10/2001 | Honma et al. ............ 428/36.5 |
| 6,420,037 | B1 | | 7/2002 | Tsuji et al. |
| 7,059,627 | B2 | * | 6/2006 | Ikeno et al. ............ 280/728.1 |

FOREIGN PATENT DOCUMENTS

| JP | 58037053 | | 3/1983 |
| JP | 2014244 | | 1/1990 |
| JP | 04201649 | A * | 7/1992 |
| JP | 5320513 | | 12/1993 |
| JP | 08134394 | A * | 5/1996 |
| JP | 9085900 | | 3/1997 |

(Continued)

OTHER PUBLICATIONS

JP 2002188056 A, Jul. 2002, Hiroyoshi, Machine translation.*

(Continued)

*Primary Examiner* — Satya Sastri
(74) *Attorney, Agent, or Firm* — Howard & Howard Attorneys PLLC

(57) ABSTRACT

A silicone rubber molding, which contains 1-50 wt % of a thermoplastic resin powder and whose silicone rubber surface possesses thermoplasticity and irregularities, and a method for manufacturing a silicone rubber molding, wherein an embossing die having surface irregularities is pressed into the surface of silicone rubber containing 1-50 wt % of a thermoplastic resin powder at a temperature that is not less than the softening point of said thermoplastic resin powder so as to transfer the irregularities of the embossing die thereto.

14 Claims, 2 Drawing Sheets

FOREIGN PATENT DOCUMENTS

| | | |
|---|---|---|
| JP | 9141783 | 6/1997 |
| JP | 10177964 | 6/1998 |
| JP | 10268679 | 10/1998 |
| JP | 2000303022 | 10/2000 |
| JP | 2002188056 A * | 7/2002 |
| JP | 2003155360 | 5/2003 |
| JP | 2004189982 | 7/2004 |

OTHER PUBLICATIONS

JP 04201649 A, Jul. 1992, Isshiki et al., Derwent Abstract.*
JP 08134394 A, May 1996, Machine translation.*
http://www.sigmaaldrich.com/img/assets/3900/Thermal_Transitions_of_Homopolymers.pdf, 2006.*
English language abstract for JP2014244 extracted from espacenet.com, Oct. 20, 2007.
English language abstract for JP5320513 extracted from espacenet.com, Oct. 20, 2007.
English language translation and abstract for JP9085900 extracted from searching PAJ, Oct. 20, 2007, 51 pages.
English language translation and abstract for JP9141783 extracted from searching PAJ, Oct. 20, 2007, 16 pages.
English language translation and abstract for JP10177964 extracted from searching PAJ, Oct. 20, 2007, 20 pages.
English language translation and abstract for JP10268679 extracted from searching PAJ, Oct. 20, 2007, 28 pages.
English language abstract for JP58037053 extracted from espacenet.com, Oct. 20, 2007.
English language abstract for JP2000303022 extracted from searching PAJ, Oct. 20, 2007.
English language translation and abstract for JP2003155360 extracted from searching PAJ, Oct. 20, 2007, 23 pages.
English language translation and abstract for JP9085900 extracted from searching PAJ, Oct. 20, 2007, 15 pages.

* cited by examiner

US 8,475,701 B2

SILICONE RUBBER FORMED PRODUCT AND METHOD FOR PRODUCTION THEREOF

RELATED APPLICATIONS

This application claims priority to and all the advantages of International Patent Application No. PCT/JP2005/016577, filed on Sep. 2, 2005, which claims priority to Japanese Patent Application No. JP2004-263439, filed on Sep. 10, 2004.

TECHNICAL FIELD

The present invention relates to a silicone rubber molding having irregularities on its surface, a manufacturing method, a liquid silicone rubber composition for air bag coating, and a method for manufacturing a silicone rubber-coated fabric for air bags.

TECHNICAL BACKGROUND

Although silicone rubber blocks and silicone rubber sheets obtained by curing silicone rubber compositions, as well as silicone rubber moldings such as silicone rubber-coated fabrics etc. produced by coating and curing silicone rubber compositions on the surface of base fabrics or other substrates have been used in the past in electrical insulating materials and diaphragms, sealant materials, air bag materials, materials for tents, materials for hoses, outdoor leisure sheets, in clothing-related applications, and in various other areas, the residual tackiness of the surfaces of such silicone rubber moldings, which persists even after vulcanization and curing, causes problems because moldings stick together and generate peeling defects during attempts to unfold folded items, etc., and, in the past, such said problems have been addressed mostly by dusting the surfaces with talc and other powders.

This method, however, makes the manufacturing process more complicated and gives rise to criticism from the standpoint of environmental hygiene-related problems caused by the dust, etc., and, in order to resolve such problems, methods have been proposed for reducing the tackiness of the surfaces of silicone rubber moldings by providing surface irregularities, such as mesh-like, crepe, and crinkle patterns, etc. Methods used to provide such irregularities include methods, where irregularities are transferred onto an uncured silicone rubber composition with the help of a film having irregularities on its surface or with the help of an embossing roll, whereupon the composition is cured (see Japanese Patent Application Publication (hereinafter referred as to "Kokai") No. 2003-155360 and Kokai No. 2004-189982). However, if the uncured silicone rubber composition utilized in such methods is liquid, limitations related to the form of the silicone rubber composition preclude its use, etc. In addition, while there are methods, in which a crinkle pattern is transferred to a silicone rubber layer by forming a silicone rubber layer on top of a mold release sheet with a crinkle finish and then removing the release sheet (Kokai No. Hei 9-141783), the use of special mold release sheets presents a concern in terms of molding costs. In addition, there is a method, in which a crinkle pattern is transferred to a silicone rubber surface by molding silicone rubber in a metal mold with a crinkle finish on the interior surface of its cavity (Kokai No. Hei 10-177964). This method, however, is only applicable to molded articles and is not economically efficient because molds have to be changed if the crinkle pattern is modified.

Moreover, Kokai No. Hei 10-268679 proposes a method, in which fine surface irregularities are formed by molding a silicone rubber composition containing dispersed lumpy particles with an average particle size of 20-100 μm and then removing the lumpy particles from its surface. However, under this method, the physical properties of the silicone rubber molding and its adhesion to the substrate tend to deteriorate because of the added lumpy particles and efficiency problems arise due to the step required for the removal of the lumpy particles. A silicone rubber-based coating composition for air bags, which contains from 0.1 wt % to 50 wt % of a spherical powder with an average particle size of from 10 to 300 μm, has been proposed in Kokai No. 2000-303022 (corresponding to U.S. Pat. No. 6,420,037). However, to achieve a sufficient reduction in tackiness, a relatively large amount of such spherical powder has to be added because the spherical powder sinks into the rubber, and, depending on the intended use, the physical properties of the silicone rubber moldings and their adhesion to the substrate may turn out to be insufficient.

Furthermore, in the silicone rubber moldings with surface irregularities obtained by the above-described methods, once formed, the irregularities cannot be modified in shape and cannot be smoothed away.

DISCLOSURE OF THE INVENTION

The present invention was made with a view to eliminate the above-mentioned problems, and it is an object of the invention to provide a silicone rubber molding with surface irregularities that can be easily and efficiently manufactured and permits smoothing or arbitrary modifications in the shape of the irregularities once they are formed.

The above-mentioned object is accomplished through the use of a silicone rubber molding containing 1-50 wt % of a thermoplastic resin powder, whose silicone rubber surface possesses thermoplasticity and irregularities; a method for manufacturing a silicone rubber molding, wherein an embossing die having surface irregularities is pressed into the surface of silicone rubber containing 1-50 wt % of a thermoplastic resin powder at a temperature that is not less than the softening point of said thermoplastic resin powder so as to transfer the irregularities of the embossing die thereto; a liquid silicone rubber composition for air bag coating, which is obtained by compounding 1-50 wt % of a thermoplastic resin powder having a softening point of 80-250° C. with a solventless addition-curing liquid silicone rubber composition of the following components:

(A) 100 parts by weight of a diorganopolysiloxane with a viscosity of 100-100,000 mPa·s at 25° C. having at least two alkenyl groups per molecule, (B) an organohydrogenpolysiloxane having at least three silicon-bonded hydrogen atoms per molecule (in an amount such that the molar ratio of the silicon-bonded hydrogen atoms in this component to the alkenyl groups in Component (A) is (0.6:1)-(20:1)), (C) a platinum group metal catalyst [in an amount providing from 0.1 to 500 parts by weight of a platinum group metal per 1,000,000 parts by weight of Component (A)], and (D) 0.1-50 parts by weight of a reinforcing silica micropowder; and a method for manufacturing a silicone rubber-coated fabric for air bags having surface irregularities, wherein a solventless addition-curing liquid silicone rubber composition containing 1-50 wt % of a thermoplastic resin powder is coated and cured on a base fabric for air bags and an embossing die having surface irregularities is pressed into the surface of the resultant silicone rubber at a temperature that is not less than the softening point of said thermoplastic resin powder so as to transfer the irregularities of the embossing die thereto.

Because the silicone rubber molding of the present invention has irregularities on its surface, it can have low surface tackiness, excellent tactile properties, aesthetic appearance, etc., and because its surface possesses thermoplasticity, if necessary, new irregularities can be added to its surface and already imparted irregularities can be reverted back to a smooth surface and new irregularities can then be imparted thereto. Moreover, the inventive method for manufacturing a silicone rubber molding makes it possible to easily and efficiently manufacture silicone rubber moldings possessing surface irregularities for the purposes of providing decoration, improving the tactile properties of products on direct contact with the human body, and reducing the tackiness of the surfaces of the moldings.

Because the inventive silicone rubber-coated fabric for air bags, which is obtained by coating a substrate with a liquid silicone rubber composition for air bag coating, has irregularities on its surface, it can have low surface tackiness, excellent re-extendability when unfolded, excellent tactile properties, aesthetic appearance, etc., and because its surface possesses thermoplasticity, if necessary, new irregularities can be added to the surface and already imparted irregularities can be reverted back to a smooth surface and new irregularities can then be imparted thereto. Moreover, the inventive method for manufacturing a silicone rubber-coated fabric for air bags makes it possible to easily and efficiently manufacture silicone rubber-coated fabric for air bags possessing surface irregularities for the purposes of providing decoration, improving the tactile properties of products on direct contact with the human body, and reducing the tackiness of the surfaces of the coated fabric.

Figure 1:
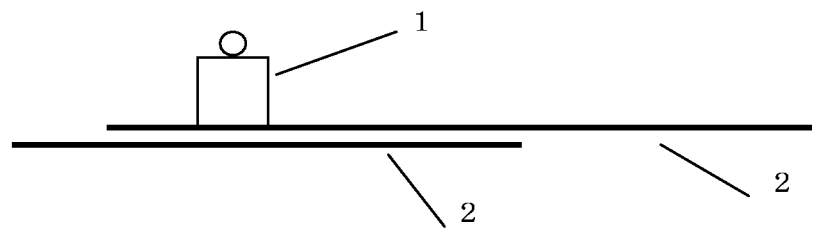
FIG. 1 is a diagram illustrating a method used for determining the coefficient of dynamic friction.

| [Description of Reference Numerals] | |
| --- | --- |
| 1. | Weight. |
| 2. | Silicone rubber-coated fabric. |
| 3. | Untreated fabric roll (plain weave fabric of Nylon 66). |
| 4. | Guide rolls. |
| 5. | Addition-curing liquid silicone rubber composition. |
| 6. | Knife coater. |
| 7. | Heating oven. |
| 8. | Metal roller with surface irregularities. |
| 9. | Rubber pressing roller. |
| 10. | Plain weave fabric of Nylon 66. |
| 11. | Cured silicone rubber coating layer. |
| 12 | Silicone rubber coating layer after transfer of irregularities. |

BEST MODE FOR CARRYING OUT THE INVENTION

The silicone rubber molding of the present invention is explained in detail below.

As described in more detail below, the thermoplastic resin powder used in the present invention is essential in imparting thermoplasticity to the surface of the inventive silicone rubber molding. The average particle size of such a thermoplastic resin powder is preferably in the range of from 1 to 100 µm, more preferably, in the range of from 1 to 80 µm, and most preferably, in the range of from 1 to 50 µm. The reason is that a size below the lower limits of the above-mentioned ranges may lead to inferior handleability and a size exceeding the upper limits of the above-mentioned ranges may lead to a deterioration in its dispersibility in the silicone rubber composition, and, in some cases, to impairing surface smoothness if the thickness of the silicone rubber molding is small. It should be noted that when the thickness of the silicone rubber molding is small, as in a silicone rubber-coated fabric, the average particle size of the thermoplastic resin powder is preferably within the above-mentioned ranges and preferably constitutes not more than 90%, more preferably, not more than 70%, and even more preferably, not more than 50% of the thickness of the silicone rubber molding.

The softening temperature of the thermoplastic resin powder, as defined in JIS K 7206, is preferably 80-250° C. and, more preferably, 90-200° C. The reason is that, for instance, in automotive interior applications, in case of storing the powder at a temperature of 40-60° C. for an extended period of time, irregularities on the surface of a silicone rubber molding tend to disappear and the difference in height and boundaries between the valleys and ridges may become insufficient if the temperature is below the lower limits of the above-mentioned ranges, and, on the other hand, imparting irregularities to the surface of a silicone rubber molding may require excessively large amounts of energy and may be economically prohibitive if the temperature exceeds the upper limits of the above-mentioned ranges.

While there are no particular limitations regarding the type of the thermoplastic resin powder so long as it does not inhibit curing when compounded with the silicone rubber composition, thermoplastic plastics powders and thermoplastic silicone resin powders are suggested as specific examples. It should be noted that thermoexpandable thermoplastic resin powders containing thermoexpandable liquid and gas inclusions and hollow thermoplastic resin powders with a true specific gravity of not more than 0.5 are undesirable for use as such thermoplastic resin powders because they make it impossible to impart sufficient thermoplasticity to the surfaces of silicone rubber moldings and in some cases may rise to the surface and impair surface smoothness. In other words, solid powders are more preferable.

The thermoplastic plastics powders are exemplified by polyethylene, polypropylene, polystyrene and other polyolefin-based resin powders; polyethylene terephthalate, polybutylene terephthalate and other polyester-based resin powders; polymethyl methacrylate resin powders; polyvinyl chloride resin powders; polyvinylidene chloride resin powders; urethane resin powders; polyamide resin powders; and ethylene-vinyl acetate copolymer resin powders. More specifically, thermoplastic plastics powders used for powder coating can be suitably utilized. Among them, polyethylene resin micropowders produced by a chemical comminution process are even more preferable because they disperse in the silicone rubber composition very well as a result of their small average particle size and the near-spherical shape of the particles, as well as because they are relatively inexpensive and easy to obtain. Although there are no limitations concerning the molecular weight of such thermoplastic resin powders, from the standpoint of the ease of heat deformation, it should be preferably not more than 300,000, and more preferably, not more than 150,000.

In terms of its structure, the thermoplastic silicone resin powder is exemplified by powders consisting essentially of $RSiO_{3/2}$ units, as well as of $R_2SiO_{2/2}$ units and $R_3SiO_{1/2}$ units (where R stands for substituted or unsubstituted $C_{1-12}$ monovalent hydrocarbon groups represented by methyl, ethyl, propyl, and other alkyl groups; vinyl, allyl, and other alkenyl groups; phenyl, tolyl, and other aryl groups; and 3,3,3-tripropyl, and other halogenated alkyl groups) and, more specifically, by powders composed of $C_6H_5SiO_{3/2}$ units, $CH_3SiO_{3/2}$ units, $(CH_3)_2SiO_{2/2}$ units, $(CH_3)(CH_2\!\!=\!\!CH)SiO_{2/2}$ units, $(CH_3)_3SiO_{1/2}$ units, and $(CH_3)_2(CH_2\!\!=\!\!CH)SiO_{1/2}$ units, etc. Such silicone resin powders can be produced by the co-hydrolysis and condensation of various silanol monomers and chlorosilanes in desired mixing ratios.

The amount of the thermoplastic resin powder compounded with the silicone rubber composition is within the range of from 1 to 50 wt %, preferably from 1 to 30 wt %, and even more preferably, from 1 to 20 wt %. The reason is that if it is below the lower limits of the above-mentioned ranges, the surface of the silicone rubber molding does not exhibit sufficient thermoplasticity and, if it exceeds the upper limits of the above-mentioned ranges, all the properties of the silicone rubber molding may deteriorate.

The silicone rubber molding of the present invention may be obtained by curing the silicone rubber composition itself in sheet or block form, or may be a composite body obtained e.g. by coating a substrate composed of metal, plastics, glass, fiber, base fabric, etc. with the silicone rubber composition.

Because the silicone rubber molding of the present invention contains from 1 to 50 wt % of the above-mentioned thermoplastic resin powder, its surface possesses thermoplasticity. In this context, the term "thermoplasticity of the silicone rubber molding" refers to a quality that produces plastic deformation when the surface of the silicone rubber molding is heated above room temperature and whereby the heating-induced plastic deformation can be reversibly maintained after cooling to room temperature.

While the surface irregularities of the inventive silicone rubber molding are selected appropriately depending on its purpose, in general, to prevent silicone rubber moldings from blocking and reduce their surface tackiness, crepe, mesh-like, reticular, crinkle patterns, and grid-like patterns, etc. are preferred, with the difference in height between the valleys and ridges of the irregularities in such a case being smaller than the thickness of the silicone rubber molding, preferably from 5 µm to 200 µm, more preferably, from 10 µm to 100 µm, and even more preferably, from 15 µm to 80 µm.

The silicone rubber molding of the present invention can be readily manufactured by pressing an embossing die having surface irregularities into the surface of silicone rubber containing 1 to 50 wt % of a thermoplastic resin powder at a temperature that is not less than the softening point of said thermoplastic resin powder so as to transfer the irregularities of the embossing die thereto. In the inventive method for manufacturing a silicone rubber molding, the embossing die with surface irregularities used for transferring irregularities to the surface of the silicone rubber molding is selected appropriately depending on the shape and form of the silicone rubber molding and on the shape and form of the irregularities imparted to the silicone rubber molding, with plate-, roll-, belt-, sheet-, and stamp-shaped, as well as reticular and grid-like dies possessing surface irregularities suggested as specific examples. If the silicone rubber molding is a silicone rubber-coated fabric for air bags or another type of silicone rubber-coated fabric or a silicone rubber tape, silicone rubber sheet or another continuous product, the irregularities are transferred preferably with the help of an annular belt possessing surface irregularities or with the aid of an embossing roll because the ability of the latter to perform continuous processing.

The temperature, at which the embossing die with irregularities is pressed into the silicone rubber molding of the present invention, is not less than the softening point of the thermoplastic resin compounded with said silicone rubber molding and is preferably not higher than the degradation temperature of said thermoplastic resin powder. Methods used for transferring the irregularities of the embossing die having irregularities to the surface of the silicone rubber molding are exemplified by a method, in which an embossing die with irregularities is applied under pressure after preheating a silicone rubber molding to a temperature not less than the softening point of the thermoplastic resin powder; a method, in which an embossing die with irregularities is pre-heated or heated to a temperature not less than said softening point and then applied under pressure to a silicone rubber molding; and a method, in which immediately after molding a silicone rubber molding from a heat-curable silicone rubber composition, an embossing die with irregularities is applied under pressure while the temperature of the surface of the silicone rubber molding is still above said softening point. To preserve the shape of the transferred irregularities after the application of the embossing die provided with irregularities to the surface of the silicone rubber molding, it is preferable to quickly cool the silicone rubber molding to a temperature below said softening point and keep the embossing die pressed against the silicone rubber molding until its surface temperature drops below said softening point. Because of the high resilience of the surface of the silicone rubber molding, the transferred irregularities may sometimes disappear and the difference in height and boundaries between the ridges and valleys may become insufficient.

Because the silicone rubber molding of the present invention has a thermoplastic surface, it is suitable for use in:
(1) products of silicone rubber exhibiting blocking-related problems and problems arising during the unfolding of folded products, such as rubber sheets, thin film, packing materials, grommets, water-proof rubber-coated fabrics, fabrics for air bags, silicone rubber-coated cables, hoses, and the like;
(2) products of silicone rubber used in direct contact with the human body, such as the straps of swimming caps, goggles, and masks; protective masks, grips on medical devices, sports equipment, non-slip coating for handles on machinery, etc.;
(3) decorative products of silicone rubber such as sales-promotion items with logotypes, designs, ornaments embossed on their surface, three-dimensional prints for clothing, and other applications.

Among them, the inventive silicone rubber molding can be suitably utilized for silicone rubber-coated fabrics for air bags and for thin sheets of silicone rubber, with silicone rubber-coated fabric for air bags being particularly preferable. Such a silicone rubber-coated fabric for air bags is composed of a base fabric woven from synthetic fiber (for instance, a fabric made from Nylon 6, Nylon 66, Nylon 46 and other polyamide fibers, a fabric made of aramide fiber, or a fabric made of polyester fiber represented by polyethylene terephthalate, etc.), which is used as the substrate, and a silicone rubber coating layer formed thereon, with the thickness of the layer being preferably in the range of from 30 to 200 micron, and more preferably, in the range of from 30 to 120 micron.

The silicone rubber molding of the present invention is a cured product of a silicone rubber composition containing from 1 to 50 wt % of the above-mentioned thermoplastic resin powder. Such a silicone rubber composition is exemplified by organic peroxide-curing silicone rubber compositions, addition-curing silicone rubber compositions, condensation-curing silicone rubber compositions, and latexes producing rubber as they undergo crosslinking in the process of water evaporation. If the silicone rubber molding of the present invention is a silicone rubber-coated fabric composed of a layer of silicone rubber applied to a base fabric, the composition is preferably an addition-curing liquid silicone rubber composition with a viscosity of 5-300 Pa·s at 25° C. and especially preferably, a solventless addition-curing liquid silicone rubber composition containing no solvents used for viscosity adjustment.

The preferred addition-curing liquid silicone rubber compositions are exemplified by the addition-curing liquid silicone rubber composition of the following ingredients shown below.

(A) 100 parts by weight of a diorganopolysiloxane with a viscosity of 100-100,000 mPa·s at 25° C. having at least two alkenyl groups per molecule,
(B) an organohydrogenpolysiloxane having at least three silicon-bonded hydrogen atoms per molecule (in an amount such that the molar ratio of the silicon-bonded hydrogen atoms in this component to the alkenyl groups in Component (A) is (0.6:1)-(20:1)),
(C) a platinum group metal catalyst [in an amount providing from 0.1 to 500 parts by weight of a platinum group metal per 1,000,000 parts by weight of Component (A)], and
(D) 0.1-50 parts by weight of a reinforcing silica micropowder, with the silicone rubber composition containing from 1 to 50 wt % of the above-mentioned thermoplastic resin powder.

The above-mentioned addition-curing liquid silicone rubber composition is explained below.

The diorganopolysiloxane of Component (A), which is the main ingredient, is an organopolysiloxane having at least two alkenyl groups per molecule and represented by the average unit formula

 [Formula 1]

(where R is the same as above, and n is 1.9~2.1).

As for the viscosity of the diorganopolysiloxane, diorganopolysiloxanes with a viscosity of 100 to 100,000 mPa·s at 25° C. are preferable, and those with a viscosity of 1000 mPa·s to 50,000 mPa·s at 25° C. are even more preferable in view of the ease of compounding and the physical properties of silicone rubber moldings obtained by curing the present silicone rubber composition. A dimethylpolysiloxane having both terminal ends blocked by dimethylvinylsiloxy groups, a copolymer of methylvinylsiloxane and dimethylsiloxane having both terminal ends blocked by dimethylvinylsiloxy groups, a copolymer of methylphenylsiloxane and dimethylsiloxane having both terminal ends blocked by dimethylvinylsiloxy groups, and a copolymer of methylvinylsiloxane and methyl(3,3,3-trifluoropropyl)siloxane having both terminal ends of the molecular chain blocked by dimethylvinylsiloxy groups are suggested as specific examples of this component.

The organohydrogenpolysiloxane of Component (B), which contains at least three silicon-bonded hydrogen atoms per molecule, is a cross-linking agent. Such organohydrogenpolysiloxanes are exemplified by methylhydrogenpolysiloxanes having both terminal ends blocked by trimethylsiloxy groups, a copolymers of methylhydrogensiloxane and dimethylsiloxane having both terminal ends blocked by trimethylsiloxy groups, a copolymer of methylhydrogensiloxane and methylphenylsiloxane having both terminal ends blocked by dimethylphenylsiloxy groups, by cyclic methylhydrogenpolysiloxanes, and by copolymers consisting of $SiO_{4/2}$ units and dimethylhydrogensiloxy units. The viscosity of such an organopolysiloxane is typically in the range of from 1 to 1,000 mPa·s. The amount of this compound is such that the molar ratio of the silicon-bonded hydrogen atoms in this organohydrogenpolysiloxane to the alkenyl groups in Component (A) is (0.6:1)-(20:1), with (1:1)~(10:1) being preferable.

The platinum group metal catalyst of Component (C) is a catalyst used to promote the addition reaction between the alkenyl groups of Component (A) and the silicon-bonded hydrogen atoms of component (B). Platinum compounds, which are easy to obtain, are typically used as such platinum group metal catalysts. Said platinum compounds are exemplified by platinum micropowder; chloroplatinic acid and alcohol solutions of chloroplatinic acid; olefin complexes of chloroplatinic acid; complexes of chloroplatinic acid and alkenylsiloxanes; diketone complexes of platinum; and platinum metal supported on silica, alumina, carbon, etc. Platinum group metal catalysts other than the platinum compounds are exemplified by compounds of rhodium, ruthenium, iridium, and palladium, such as, for instance, $RhCl(PPh_3)_3$, $RhCl(CO)(PPh_3)_2$, $Ru_3(CO)_{12}$, $IrCl(CO)(PPh_3)_2$, and $Pd(PPh_3)_4$. In the formulas, Ph stands for a phenyl group.

The amount, in which this component is added, is typically from 0.1 to 500 parts by weight, and, preferably, from 1 to 50 parts by weight per 1,000,000 parts by weight of Component (A). The reason is that below the lower limits of the above-mentioned ranges the reaction does not proceed to a sufficient degree, and, on the other hand, if it exceeds the upper limits of the above-mentioned ranges, the reaction becomes economically prohibitive.

The reinforcing silica micropowder of Component (D) is used to improve the mechanical strength of silicone rubber moldings obtained by curing the above-mentioned addition-curable liquid silicone rubber composition. Component (D) is exemplified by fumed silica, precipitated silica, and hydrophobic silica obtained by treating the surface of these reinforcing silica micropowders with organosilicon compounds, etc. Among them, reinforcing silica micropowders with a specific surface area of not less than 50 m$^2$/g are preferred. The amount of the added reinforcing silica micropowder is preferably 0.1 to 50 parts by weight, and even more preferably, 5 to 40 parts by weight per 100 parts by weight of Component (A).

In addition to the above components, a cure retarder is preferably added in the range of from 0.01 to 10 parts by weight per 100 parts by weight of Component (A).

Moreover, in order to improve the fire retardance and mechanical strength of the silicone rubber molding obtained by curing the above-mentioned addition-curing liquid silicone rubber composition, an organopolysiloxane resins that has no softening point may be combined therewith in addition to the above-mentioned components. Resins composed of $(CH_3)_3SiO_{1/2}$ units and $SiO_{4/2}$ units, resins composed of $(CH_3)_3SiO_{1/2}$ units, $(CH_2=CH)SiO_{3/2}$ units, and $SiO_{4/2}$ units, resins composed of $(CH_2=CH)(CH_3)_2SiO_{1/2}$ units and $SiO_{4/2}$ units, and resins composed of $(CH_2=CH)(CH_3)_2SiO_{1/2}$ units and $(CH_2=CH)SiO_{3/2}$ units are suggested as such organopolysiloxane resins. Among them, resins containing vinyl groups are preferred because they improve the physical strength of the silicone rubber moldings. In addition, the resins may be either liquid or solid at room temperature, with resins possessing miscibility with Component (A) being more preferable. The amount of this component is preferably from 5 to 80 parts by weight, and even more preferably, from 10 to 80 parts by weight per 100 parts by weight of Component (A).

Moreover, in addition to the above compounds, organic titanic acid esters, titanium chelate compounds, and other organic titanium compounds; epoxy-containing organoalkoxysilanes; and epoxy-containing organopolysiloxanes may be added as adhesion-imparting agents. The amount of the adhesion-imparting agents is preferably in the range of from 0.1 to 5 parts by weight per 100 parts by weight of Component (A).

Furthermore, various additives publicly known in the past as additives used in silicone rubber compositions may be added as long as they do not detract from the object of the present invention, including, for instance, quartz powder, diatomaceous earth, calcium carbonate, magnesium carbonate, and other extending fillers; cerium oxide, cerium hydroxide, iron oxides, and other heat-resistant agents; red iron oxide, titanium oxides, carbon black and other pigments; and fire retardant agents.

The addition-curing liquid silicone rubber composition can be readily prepared by combining the above-mentioned Components (A) through (D) and, if necessary, other ingredients, and mixing them together. In particular, it is preferable to prepare a liquid silicone rubber base compound by mixing Component (A) and the reinforcing silica micropowder under heating and, after cooling the compound, combine it with the thermoplastic resin powder and, if necessary, other ingredients. Means that can be used for mixing the ingredients include various mixing equipment used in the production of silicone rubber compositions, such as, for instance, kneader-mixers, pressurized kneader-mixers, Ross mixers, continuous kneader-extruders, and other mixing equipment or kneading equipment.

Figure 2:
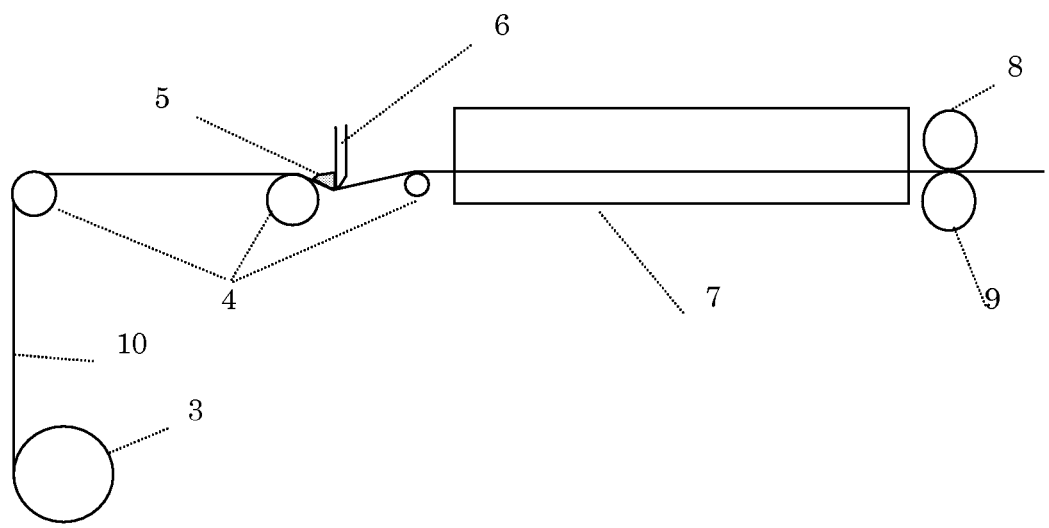
FIG. 2 is a diagram illustrating an exemplary method used for manufacturing a silicone rubber-coated fabric for air bags.
Figure 3:
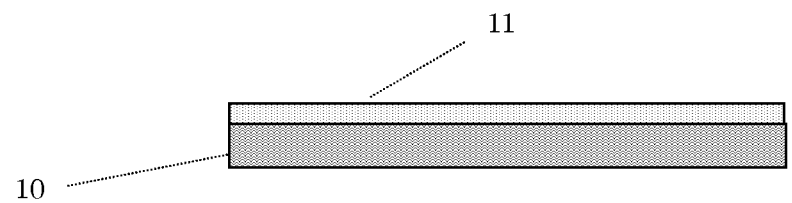
FIG. 3 is a diagram illustrating an example of a silicone rubber-coated fabric prior to the transfer of irregularities.
Figure 4:
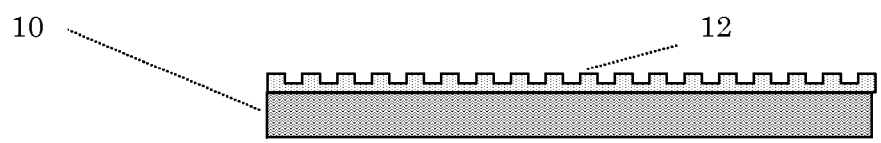
FIG. 4 is a diagram illustrating an example of a silicone rubber-coated fabric after the transfer of irregularities.

FIG. 2 illustrates an exemplary method for manufacturing the inventive silicone rubber molding. A silicone rubber-coated fabric is produced by coating plain weave fabric made of Nylon 66 with the addition-curing liquid silicone rubber composition 5 and placing it in a hot-air heating oven 7. A rubber pressing roller 9 and a metal roller 8, which has surface irregularities, are arranged at the exit outlet of the heating oven 7 and the irregularities of the metal roller 8, which has irregularities on its surface, are transferred to the surface of the silicone rubber coating layer of the silicone rubber-coated fabric when the silicone rubber-coated fabric passes through the gap between the rollers. If the surface of the silicone rubber-coated fabric exiting the heating oven has a temperature equal or higher than the softening point of the thermoplastic resin powder compounded with the addition-curing liquid silicone rubber composition 5, no particular heating means is necessary for the metal roller 8 that has irregularities on its surface. Generally speaking, in order to sufficiently cure the addition-curing liquid silicone rubber composition 5, the temperature of the heating oven 7 should preferably be in the range of from 120 to 200° C. and, if the softening point of the thermoplastic resin powder compounded with the addition-curing liquid silicone rubber composition 5 is from 80° C. to 110° C., no heating means is not particularly necessary for the metal roller 8, and the silicone rubber-coated fabric with surface irregularities can be produced in an efficient manner. The thus produced silicone rubber-coated fabric can be suitably utilized as silicone rubber-coated fabric for air bags.

EXAMPLES

Below, the present invention is explained using Examples. In the Examples, the term "parts" refers to "parts by weight" and viscosity is a value measured at 25° C. In addition, "Me" stands for a methyl group and "Vi" stands for a vinyl group.

[Measurement of Dynamic Friction Coefficient]

Two rectangular test specimens, each 5 cm wide and 20 cm long, were cut out from the silicone rubber-coated fabric, whereupon, as shown in FIG. 1, the two test specimens were superimposed with the silicone rubber-coated surfaces facing inward, and placed under a load, M1. After securing the bottom specimen of silicone rubber-coated fabric to a test bench and attaching the end of the top specimen of silicone rubber-coated fabric to a tensile tester, the fabric was pulled at a rate of 50 mm/min, sliding it on top of the bottom piece of silicone rubber-coated fabric. The load applied at such time was recorded on a chart. The average value of the load, excluding the initial peak, was designated as M2, and the ratio of M2/M1 was used as the dynamic friction coefficient.

[Measurement of Flammability]

The flammability of the silicone rubber-coated fabric was measured in accordance with the method defined in FMVSS No. 302.

[Measurement of Adhesion]

The adhesion of the silicone rubber-coated fabric was measured using a Scott abrasion tester, in which the fabric was rubbed 1,000 times under a load of 1 kgf, whereupon the condition of the silicone rubber coating was examined to determine if there were any abnormalities, such as silicone rubber coating peeling off the base fabric, etc.

Working Example 1

50 parts by weight of a dimethylpolysiloxane with a viscosity of 10,000 mPa·s having both terminal ends of the molecular chain blocked by dimethylvinylsiloxy groups (vinyl group content: 0.13 wt %) and 50 parts by weight of a mixture (mixing ratio: 42:58) of a vinyl-containing organopolysiloxane resin (vinyl group content: 1.58 wt %) with a molecular weight of 12,000, which was composed of $ViMe_2SiO_{1/2}$ units, $Me_3SiO_{1/2}$ units, and $SiO_{4/2}$ units and had no softening point, and a dimethylpolysiloxane (vinyl group content: 0.23 wt %) with a viscosity of 2,000 mPa·s having both terminal ends of the molecular chain blocked by dimethylvinylsiloxy groups were placed in a Ross mixer. Subsequently, they were combined with 14 parts by weight of a fumed silica with a specific surface area of 200 $m^2/g$, 2 parts of water, and 5 parts of hexamethyldisilazane, which was used as a surface treating agent for the silica, whereupon a flowable liquid silicone rubber base compound was prepared by heating the above mixture at 170° C. for 30 minutes under high vacuum.

Subsequently, 10 parts by weight of a polyethylene resin powder (Flothene UF-20 from Sumitomo Seika Chemicals Co., Ltd., with an average particle size of 25 μm and a softening point of 105° C.) were combined with 100 parts by weight of the above liquid silicone rubber base compound and mixed to homogeneity. A liquid silicone rubber composition was prepared by combining this mixture with 6.5 parts of a copolymer of dimethylsiloxane and methylhydrogensiloxane represented by the formula $Me_3SiO(MeHSiO)_6(Me_2SiO)_4SiMe_3$ (in an amount such that the number of moles of silicon-bonded hydrogen atoms contained in the copolymer of dimethylsiloxane and methylhydrogensiloxane per 1 mole of the vinyl groups contained in the vinyl-containing organopolysiloxane forming part of the silicone rubber base compound is 1.7), 0.2 parts of a complex of chloroplatinic acid and divinyltetramethyldisiloxane (platinum metal content: 0.4 wt %), 0.06 parts 3,5-dimethyl-1-hexyn-3-ol as a cure retarder, and 2.0 parts of γ-glycidoxypropyltrimethoxysilane as an adhesion-imparting agent and homogeneously mixing the ingredients. The viscosity of this liquid silicone rubber composition was 100 Pa·s.

A silicone rubber-coated fabric was prepared by coating a woven fabric made of Nylon 66 (425 dtx) with the liquid silicone rubber composition to provide a layer with a thickness of 90 μm and then placing it in a heating oven at 180° C. for 1 minute to cure the composition. Immediately after removing said silicone rubber-coated fabric from the heating oven, irregularities were transferred to the surface of its silicone rubber coating by applying a wire mesh (plain weave 120-mesh, wire diameter: 80 μm, mesh size: 130 μm) under pressure to the surface of the silicone rubber coating, allowing the fabric to cool down in this condition, and then removing the wire mesh. The difference in height between the ridges and valleys of the irregularities was 30-50 μm. The resultant silicone rubber-coated fabric having irregularities on the surface of the silicone rubber coating was evaluated to determine the dynamic friction coefficient of the surface of the silicone rubber coating, the flammability of the silicone rubber-coated fabric in accordance with FMVSS No. 302, and the adhesion of the silicone rubber coating to the Nylon 66 fabric using a Scott abrasion tester (under a load of 1 kgf, number of repetitions: 1,000). The results of the evaluation were listed along with those of the comparative examples in Table 1, which is shown below. The dynamic friction coefficient of the silicone rubber coating of the resultant silicone rubber-coated fabric was extremely small in comparison with the silicone rubber coating of the comparative examples, in other words, its tackiness was greatly reduced, but its self-extinguishing properties and adhesion were not reduced and it was suitable was use in air bags.

Working Example 2

A silicone rubber-coated fabric having irregularities on the surface of its silicone rubber coating was prepared in the same manner as in Working Example 1, with the exception that, unlike in Working Example 1, after cooling the silicone rubber coated fabric removed from the heating oven to room temperature, the fabric was re-heated in the heating oven at 180° C. for 1 minute and then, immediately after removing it from the heating oven, a wire mesh (plain weave 120-mesh; wire diameter: 80 μm, mesh size: 130 μm) was applied under pressure to the surface of the silicone rubber coating. The difference in height between the ridges and valleys of the irregularities was 30-50 μm. The resultant silicone rubber-coated fabric having irregularities on the surface of its silicone rubber coating was evaluated to determine its properties in the same manner as in Working Example 1, with the results listed in Table 1, which is shown below.

Working Example 3

A silicone rubber-coated fabric having irregularities on the surface of its silicone rubber coating was prepared in the same manner as in Working Example 1, with the exception that, unlike in Working Example 1, after cooling the silicone rubber coated fabric removed from the heating oven to room temperature, a wire mesh (plain weave 120-mesh; wire diameter: 80 μm, mesh size: 130 μm) pre-heated for 10 minutes in the heating oven at 180° C. was applied under pressure to the surface of the silicone rubber coating. The difference in height between the ridges and valleys of the irregularities was 30-50 μm. The resultant silicone rubber-coated fabric having irregularities on the surface of its silicone rubber coating was evaluated to determine its properties in the same manner as in Working Example 1, with the results listed in Table 1, which is shown below.

Working Example 4

When the silicone rubber-coated fabric prepared in Working Example 1, which had irregularities on the surface of its silicone rubber coating, was heated for 2 minutes in the heating oven at 150° C. and cooled to room temperature, its surface became smooth. Immediately after reheating the silicone rubber-coated fabric having the smooth surface in the heating oven at 180° C. for 1 minute and removing it from the heating oven, irregularities were transferred to the surface of the silicone rubber coating by applying a wire mesh (plain weave 120-mesh; wire diameter: 80 μm, mesh size: 130 μm) under pressure to the surface of the silicone rubber coating, allowing the fabric to cool down in this condition, and then removing the wire mesh. The difference in height between the ridges and valleys of the irregularities was 30-50 μm. The resultant silicone rubber-coated fabric having irregularities on the surface of its silicone rubber coating was evaluated to determine its properties in the same manner as in Working Example 1, with the results listed in Table 1, which is shown below.

Comparative Example 1

A liquid silicone rubber composition was prepared in the same manner as in Working Example 1, except that, unlike in Working Example 1, the polyethylene resin powder was not added. The viscosity of the composition was 56 Pa·s. A silicone rubber-coated fabric was prepared by coating a woven fabric made of Nylon 66 (425 dtx) with this liquid silicone rubber composition so as to provide a layer with a thickness of 90 μm and then placing it in a heating oven at 180° C. for 1 minute to cure the composition. The properties of the silicone rubber-coated fabric were evaluated in the same manner as in Working Example 1, with the results listed in Table 1, which is shown below.

Comparative Example 2

Immediately after reheating the silicone rubber-coated fabric prepared in Comparative Example 1 in the heating oven at 180° C. for 1 minute and removing it from the heating oven, a wire mesh (plain weave 120-mesh; wire diameter: 80 μm, mesh size: 130 μm) was applied under pressure to the surface of the silicone rubber coating, the fabric was allowed to cool down in this condition, and the wire mesh was removed. However, no irregularities were transferred to the silicone rubber coating. Its properties were evaluated in the same manner as in Working Example 1, with the results listed in Table 1, which is shown below.

TABLE 1

|  | Working Example 1 | Working Example 2 | Working Example 3 | Working Example 4 | Comparative Example 1 | Comparative Example 2 |
|---|---|---|---|---|---|---|
| Dynamic friction coefficient | 0.4 | 0.4 | 0.4 | 0.4 | 2.0 | 2.0 |
| Flammability according to FMVSS No. 302 | Exhibited self-extinguishing properties | Exhibited self-extinguishing properties | Exhibited self-extinguishing properties | Exhibited self-extinguishing properties | Exhibited self-extinguishing properties | Exhibited self-extinguishing properties |
| Scott abrasion test | Passed | Passed | Passed | Passed | Passed | Passed |

The invention claimed is:

1. A method for manufacturing a silicone rubber molding, wherein an embossing die having surface irregularities is pressed into a surface of a silicone rubber containing 1 to 50 wt % of a thermoplastic resin powder at a temperature that is not less than the softening point of the thermoplastic resin powder so as to transfer the irregularities of the embossing die thereto.

2. The method according to claim 1, wherein the silicone rubber molding is a composite body made up of silicone rubber and a substrate.

3. The method according to claim 1, wherein the softening point of the thermoplastic resin powder, as defined in JIS K 7206, is 80-250° C.

4. The method according to claim 1, wherein the average particle size of the thermoplastic resin powder is 1 μm to 100 μm.

5. The method according to claim 4, wherein the thermoplastic resin powder is a polyethylene resin powder with an average particle size of 1 μm to 50 μm.

6. The method according to claim 2, wherein the substrate is a base fabric and the silicone rubber molding is a silicone rubber-coated fabric for air bags.

7. A method for manufacturing a silicone rubber coated fabric for air bags having surface irregularities, wherein a base fabric used for air bags is coated with a solventless addition-curing liquid silicone rubber composition containing 1-50 wt % of a thermoplastic resin powder, the composition is cured, and an embossing die having surface irregularities is pressed into the surface of the produced silicone rubber at a temperature that is not less than the softening point of said thermoplastic resin powder so as to transfer the irregularities of the embossing die thereto.

8. The method for manufacturing a silicone rubber-coated fabric for air bags according to claim 7, wherein the solventless addition-curing liquid silicone rubber composition comprises:

(A) 100 parts by weight of a diorganopolysiloxane with a viscosity of 100-100,000 mPa·s at 25° C. and having at least two alkenyl groups per molecule, (B) an organohydrogenpolysiloxane having at least three silicon-bonded hydrogen atoms per molecule in an amount such that the molar ratio of the silicon-bonded hydrogen atoms in this component to the alkenyl groups in Component (A) is (0.6:1)-(20:1), (C) a platinum group metal catalyst in an amount providing 0.1-500 parts by weight of a platinum group metal per 1,000,000 parts by weight of Component (A), and (D) 0.1-50 parts by weight of a reinforcing silica micropowder.

9. The method according to claim 2, wherein the softening point of the thermoplastic resin powder, as defined in JIS K 7206, is 80-250° C.

10. The method according to claim 2, wherein the average particle size of the thermoplastic resin powder is 1 μm to 100 μm.

11. The method according to claim 3, wherein the average particle size of the thermoplastic resin powder is 1 μm to 100 μm.

12. The method according to claim 9, wherein the average particle size of the thermoplastic resin powder is 1 μm to 100 μm.

13. The method according to claim 1, wherein the difference in height between the valleys and ridges of said irregularities of said silicone rubber molding is from 5 to 200 μm.

14. The method for manufacturing a silicone rubber-coated fabric for air bags according to claim 7, wherein the difference in height between the valleys and ridges of the irregularities of the silicone rubber molding is from 5 to 200 μm.

* * * * *